United States Patent
Shotey et al.

(10) Patent No.: US 8,658,893 B1
(45) Date of Patent: Feb. 25, 2014

(54) ELECTRICAL DEVICE WITH INTERCHANGEABLE FACEPLATES

(75) Inventors: Marcus J. Shotey, Scottsdale, AZ (US);
Jeffrey P. Baldwin, Phoenix, AZ (US);
Nathaniel A. Falendysz, Phoenix, AZ (US); Thomas A. Miserendino, Gilbert, AZ (US); John Klein, Gilbert, AZ (US); Samuel Dumpe, Scottsdale, AZ (US)

(73) Assignee: Hubbell Incorporated, Shelton, CT (US)

( * ) Notice: Subject to any disclaimer, the term of this patent is extended or adjusted under 35 U.S.C. 154(b) by 71 days.

(21) Appl. No.: 13/051,902

(22) Filed: Mar. 18, 2011

Related U.S. Application Data

(60) Provisional application No. 61/316,080, filed on Mar. 22, 2010, provisional application No. 61/354,876, filed on Jun. 15, 2010.

(51) Int. Cl.
*H01H 9/02* (2006.01)
(52) U.S. Cl.
USPC ............... 174/58; 174/53; 439/237; 439/293
(58) Field of Classification Search
USPC ........ 174/50, 53, 57, 58, 66, 67; 220/3.2–3.9, 220/4.02, 241, 242; 439/535, 536, 137; 200/237, 293, 297; 361/600, 601, 361/679.01
See application file for complete search history.

(56) References Cited

U.S. PATENT DOCUMENTS

| | | | | |
|---|---|---|---|---|
| 4,857,669 | A * | 8/1989 | Kitamura et al. | 174/53 |
| 5,898,130 | A * | 4/1999 | Tansi et al. | 174/66 |
| 6,160,219 | A * | 12/2000 | Maltby et al. | 174/66 |
| 6,617,511 | B2 * | 9/2003 | Schultz et al. | 174/53 |
| 6,657,144 | B2 * | 12/2003 | Savicki et al. | 174/53 |
| 6,680,438 | B1 * | 1/2004 | Campbell et al. | 174/66 |
| 6,870,099 | B1 * | 3/2005 | Schultz et al. | 174/53 |
| 6,884,111 | B2 * | 4/2005 | Gorman | 174/53 |
| 7,400,239 | B2 * | 7/2008 | Kiko et al. | 200/297 |
| 7,938,676 | B1 * | 5/2011 | Patel et al. | 439/137 |
| 7,994,436 | B2 * | 8/2011 | Yamamoto et al. | 174/57 |
| 8,067,690 | B2 * | 11/2011 | Anders et al. | 174/50 |
| 8,237,064 | B2 * | 8/2012 | Trolese et al. | 174/67 |
| 8,299,359 | B2 * | 10/2012 | Alderson et al. | 174/66 |
| 2011/0261511 | A1 * | 10/2011 | Alderson et al. | 220/241 |

* cited by examiner

*Primary Examiner* — Angel R Estrada
(74) *Attorney, Agent, or Firm* — Alan I. Cantor; Alfred N. Goodman; Mark S. Bicks

(57) ABSTRACT

An electrical device including a device body having a rear section configured to fit into an electrical box and at least one device mounting tab having an aperture for a fastener, a front section secured directly to the rear section, and an interchangeable face removably secured to the front section. The interchangeable face may include a frame surrounding a movable element.

13 Claims, 4 Drawing Sheets

ELECTRICAL DEVICE WITH INTERCHANGEABLE FACEPLATES

CROSS REFERENCE TO RELATED APPLICATIONS

This application claims the benefit to the filing date of U.S. Provisional Patent Application 61/316,080 to Shotey et al. entitled "Electrical Device with Interchangeable Face" which was filed on Mar. 22, 2010 and U.S. Provisional Patent Application 61/354,876 to Shotey et al. entitled "Alternate Ways to Mount Electrical Interchangeable Faceplates on Electrical Devices" which was filed on Jun. 15, 2010, the disclosures of which are herby incorporated herein by reference.

BACKGROUND OF THE INVENTION

1. Technical Field

Aspects of the present disclosure relate to electrical devices with a face that can be interchanged to provide a different look.

2. Background Art

Electrical devices, and specifically electrical receptacles capable of receiving electrical plugs to provide electricity to the electrical plug are well known. In the United States, electrical receptacles generally include two or three sets of blade apertures, with each set arranged to receive an electrical plug. The electrical receptacle or device is sold as a single unit or a multi-pack in home improvement stores and is then wired in by either a professional electrician or by the homeowner if he or she is comfortable with electrical wiring. Then, when the user wants to update the look of the electrical device, the electrical device is painted over, or if the electrical device face is chipped, the user must then replace the entire electrical device.

For the average homeowner, replacing the electrical device can be expensive due to hiring an electrician or dangerous should they attempt the replacement themselves. Still further, replacing the electrical device because the face is chipped, painted over, or is simply not the correct cover is expensive and inefficient.

SUMMARY

This disclosure includes one or more electrical devices with interchangeable faces.

A particular aspect broadly includes an electrical device including a device body having a rear section and at least one device mounting aperture, a front section opposite the rear section and permanently secured to the rear section, and an interchangeable face removably secured to the front section.

In particular implementations, the interchangeable face may be complementary in shape to the front section. The front section and the rear section may be integrally formed. The front section may be secured to the rear section with at least one screw. The interchangeable face may further include a frame surrounding a movable element. The moveable element may be part of a switch.

In additional particular implementations, the front section may further include a pair of notches and the interchangeable face may be a faceplate that further includes a pair of tabs extending rearward from the interchangeable faceplate. The pair of tabs may be releaseably secured within the pair of notches. The interchangeable faceplate may further include a pair of mounting holes and the front section may further include a pair of threaded holes. The interchangeable faceplate may be secured to the front section through the pair of mounting holes and threaded holes with a pair of fasteners. The thickness of the interchangeable faceplate is less than a standard electrical device. The thickness of the interchangeable faceplate and the thickness of the front section approximately equal a thickness of a standard electrical device. A wall plate may contact at least a portion of the interchangeable faceplate. A wall plate may prevent removal of the interchangeable faceplate.

A particular aspect may broadly include an electrical device including a device body having a rear section and at least one device mounting aperture, a front section opposite the rear section, an interchangeable face removably secured to the front section, and a frame surrounding the interchangeable face.

In particular implementations, the frame may be removably secured to the front surface. The interchangeable face may be movable on the front section. The interchangeable face may be pivotable on the front section. The electrical device may include at least one button extending beyond the front section, wherein the interchangeable face operates the button to activate and deactivate the electrical device.

A particular aspect may include a method of restoring an electrical device including the steps of providing an electrical device having a device body with a rear section, a front section, at least one device mounting aperture, and an interchangeable face secured to the front section, mounting the electrical device to an electrical box through the at least one device mounting aperture, removing the interchangeable face, and installing a second interchangeable face on the front section.

BRIEF DESCRIPTION OF THE DRAWINGS

Features of particular embodiments and implementations of electrical devices will hereinafter be described in conjunction with the appended drawings, where like designations denote like elements, and.

DETAILED DESCRIPTION

Accordingly, there are a variety of electrical devices which can include an interchangeable face.

Figure 1:
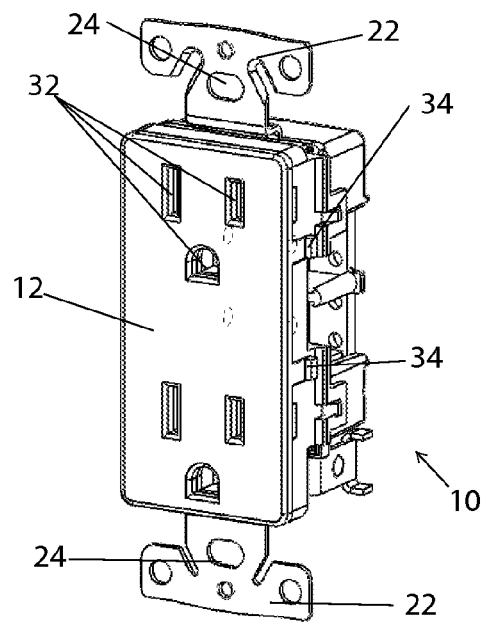
FIG. 1 is a perspective view of an electrical receptacle with an interchangeable faceplate mounted on a front surface.
Figure 2:
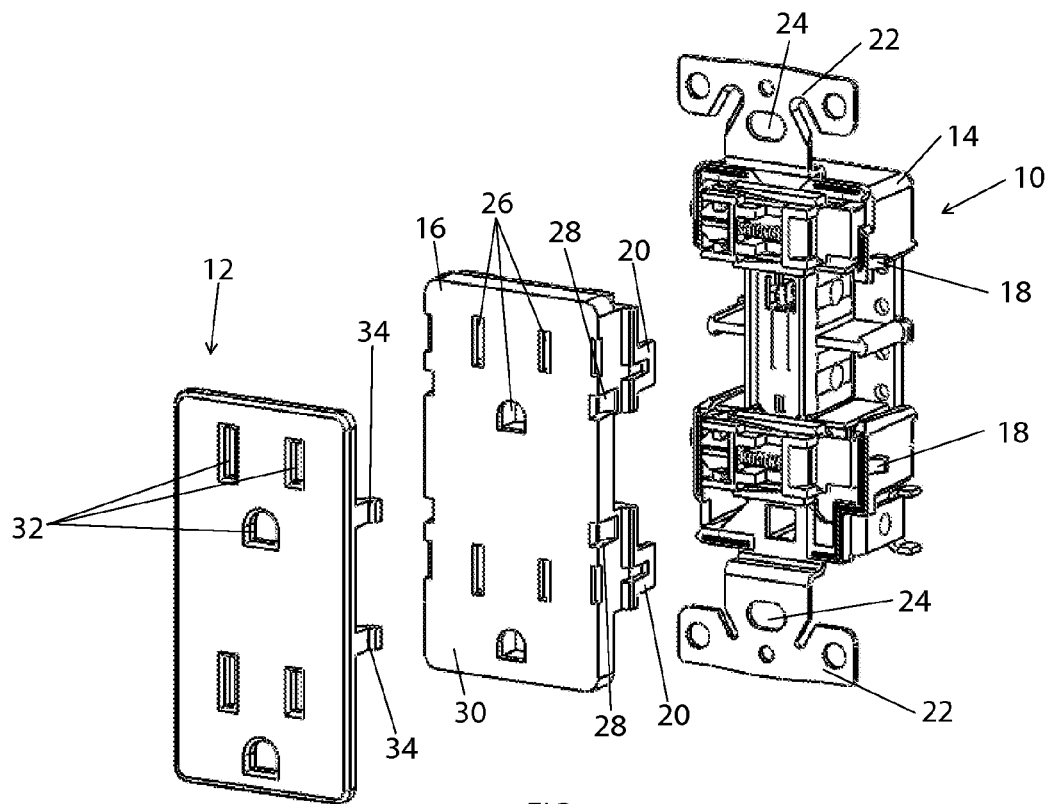
FIG. 2 is an exploded perspective view of the electrical receptacle of FIG. 1 showing the front surface and the interchangeable faceplate removed.

FIGS. 1 and 2 illustrate an electrical device 10 having an interchangeable faceplate 12. Electrical device 10 includes a rear section 14 connected to a front section 16. Rear section 14 may include one or more mounting protrusions 18 which can be connected to clips 20 extending from front section 16. While the connection between mounting protrusions 18 and clips 20 may be releaseable, the front and rear sections may be permanently secured to one another with any suitable process, including but not limited to plastic or sonic welding, rivets, or adhesive.

Rear section 14 also includes the inner working of the electrical device, including but not limited to the electrical contacts, mounting structures, and any tamper resistant shutters. Still further, the rear section also includes a pair of mounting tabs 22, each mounting tab having a mounting aperture 24. Mounting tabs 22 and mounting apertures 24 preferably extend from top and bottom portions of rear section 14 and are arranged to receive fasteners well known in the art to mount the electrical device to an electrical box also well known in the art.

Front section 16 also includes a plurality of blade apertures 26 arranged to receive the blades of an electrical plug (not shown) and a plurality of notches 28. Notches 28 are preferably located adjacent a front surface 30 of the front section 16 so that the interchangeable faceplate 12 can easily and efficiently be releaseably connected at notches 28.

Interchangeable faceplate 12 includes a plurality of blade apertures 32, which are aligned with blade apertures 26 in front section 16, so that electrical plug blades can extend through both apertures 26 and 32. Advantageously, the thickness of front section 16 and interchangeable faceplate 12 may each be thinner than normal so that the combination of the two components approximately equals the thickness of a front surface of a traditional electrical device. Accordingly, the thickness of interchangeable faceplate 12 and front section 16 may each be thinner than a standard electrical device face.

The interchangeable faceplate 12 also includes a plurality of tabs 34 extending rearward and arranged to be releaseably secured within notches 28 of the front section. Due to the interchangeable faceplate being complementary in shape to the front section and the small size of tabs 34, the homeowner will not detect that a different interchangeable faceplate may be located on the electrical device.

Accordingly, a professional electrician or an experienced homeowner will install the combined rear section 14 and front section 16, which may be permanently welded together, into an electrical box through the mounting apertures 24. The installer may have installed the electrical device with or without the interchangeable faceplate 12 already mounted. If an interchangeable faceplate is not already mounted on the front section, the user will snap an interchangeable faceplate into position by locating the tabs 34 within the front section notches 28. To remove an interchangeable faceplate, the user simple pulls or pushes on the tabs 34 to release the tabs from the notches 28 and pulls the interchangeable faceplate away from the front section. Now, the installer is able to locate a different interchangeable faceplate on the front section. Accordingly, there are a number of interchangeable faceplates that can be secured on the electrical device without wiring in a new electrical device.

Figure 3:
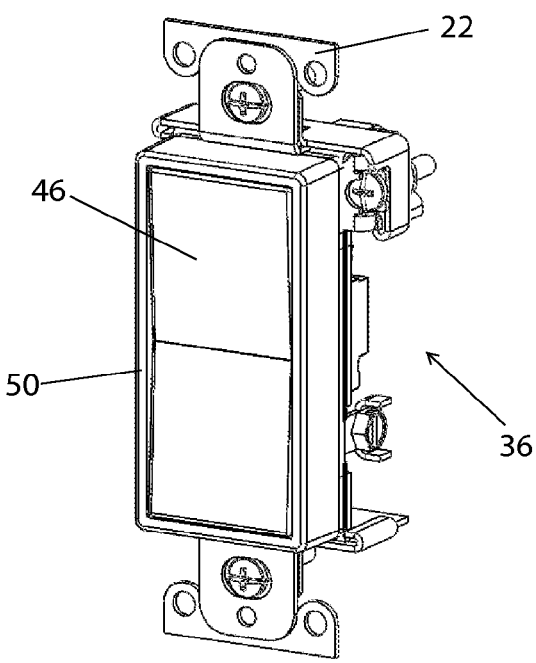
FIG. 3 is a perspective view of an electrical device rocker switch with a movable element and a frame mounted on a front surface.
Figure 4:
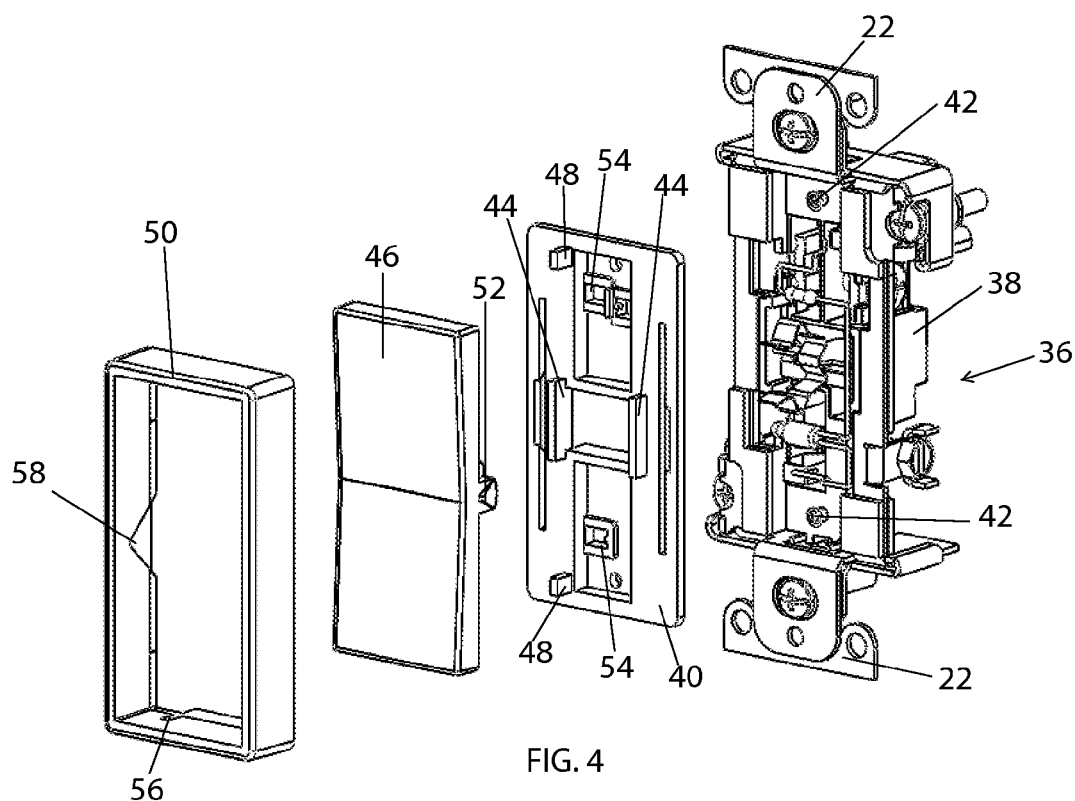
FIG. 4 is an exploded perspective view of the electrical device rocker switch of FIG. 3 showing the front surface, rocker and frame removed.

FIGS. 3 and 4 illustrate an electrical device 36 with a rocker switch. Electrical device 36 includes a rear section 38 and a front section 40. Rear section 38 includes a pair of switch buttons 42 which are pressed to operate the internal circuitry of the electrical device. Front section 40 includes a pair of rocker mounts 44 arranged to permit a rocker switch movable element 46 to pivot within a given degree of rotation. The front section may also include one or more alignment ribs 48 to assist in locating a frame 50. The movable element 46 may pivot or rotate about a central tab 52 and press either switch button 42 until the movable element contacts a stop 54 on the front section 40.

Frame 50 may include a pair of slots 56 which are arranged to align with alignment ribs 48 of the front section 40. Further, a pair of grooves 58 are formed on an internal surface of the frame to permit the movable element 46 to rotate in both directions. Finally, frame 50 may be removably secured in place around movable element 46 so that either or both of the movable elements and the frame can be replaced at any time by the homeowner.

Figure 5:
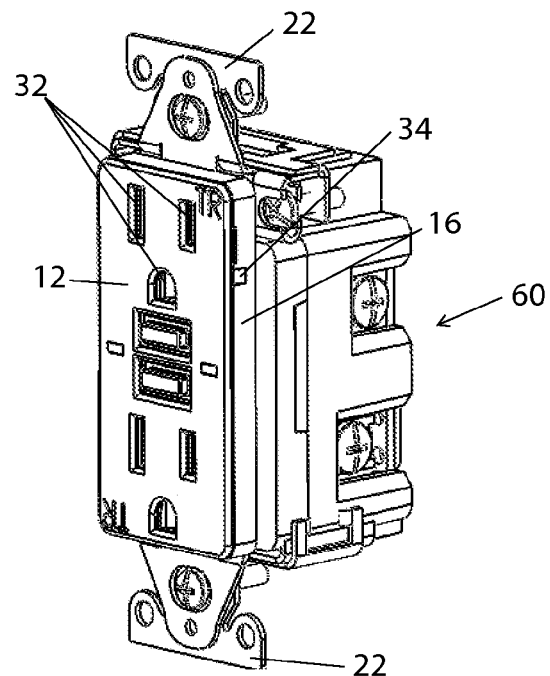
FIG. 5 is a perspective view of a ground fault circuit interrupter with an interchangeable faceplate on a front surface.
Figure 6:
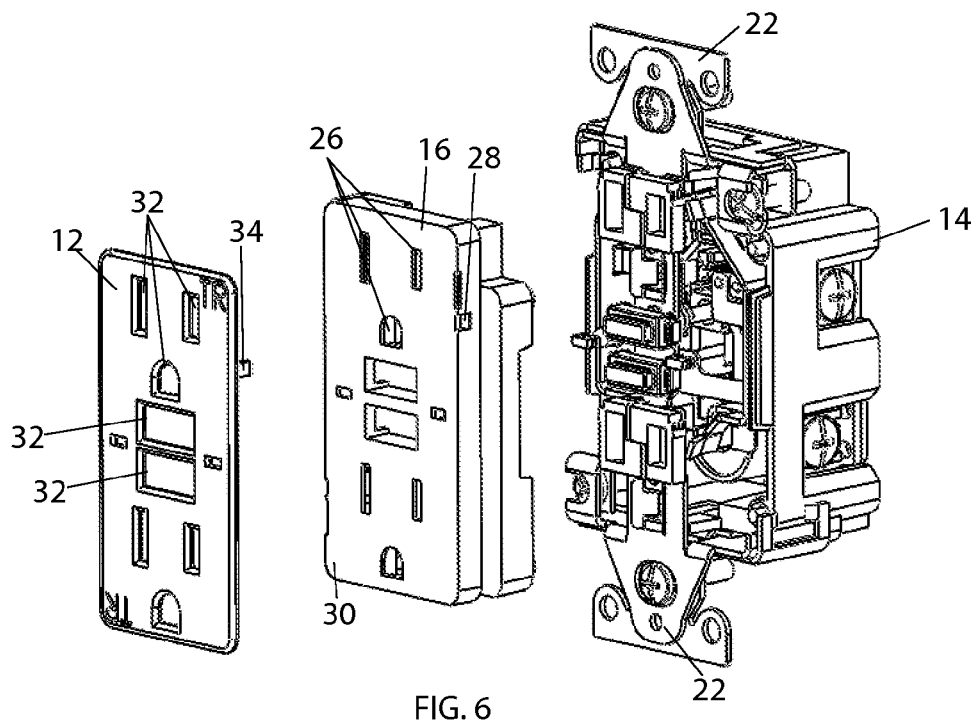
FIG. 6 is an exploded perspective view of the ground fault circuit interrupter of FIG. 5 showing the front surface and the interchangeable faceplate removed.

FIGS. 5 and 6 illustrate an electrical device 60, and specifically a ground fault circuit interrupter (GFCI) device. The GFCI is similar to the decorator style electrical device shown and described in FIGS. 1 and 2 above. For convenience, similar references numbers have been used to describe similar parts. While the internal components of the GFCI are significantly different, the exterior remains similar, with the addition of a test button and a reset button on the electrical device face 30. Accordingly, interchangeable faceplate 12 may also include an additional two apertures so that the user may access the test and reset buttons.

Figure 7:
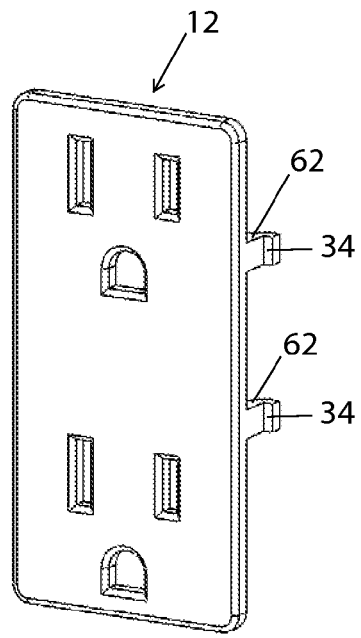
FIG. 7 is a perspective view of an interchangeable faceplate with two mounting tabs extending from each side.
Figure 8:
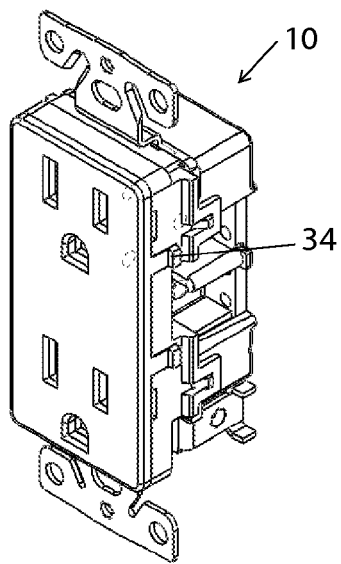
FIG. 8 is a perspective view of an electrical receptacle with the interchangeable faceplate of FIG. 7 mounted thereon.

FIG. 7 illustrates the first embodiment of interchangeable faceplate 12 (see FIG. 2) having tabs 34 with cam portions 62. FIG. 8 illustrates the cam portions 62 resting within notches 28 in the front section of the electrical device.

Figure 9:
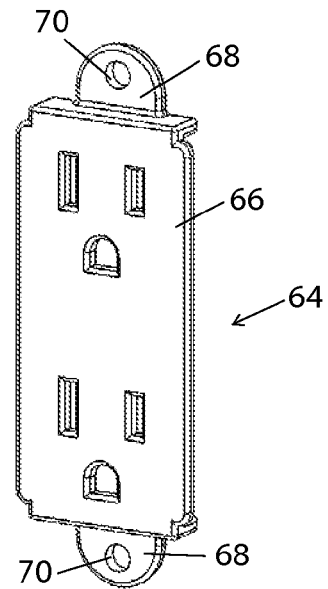
FIG. 9 is a perspective view of an interchangeable faceplate with a mounting tab extending from a top surface and a bottom surface; and, FIG. 10 is a perspective view of an electrical receptacle with the interchangeable faceplate of FIG. 9 mounted thereon.
Figure 10:
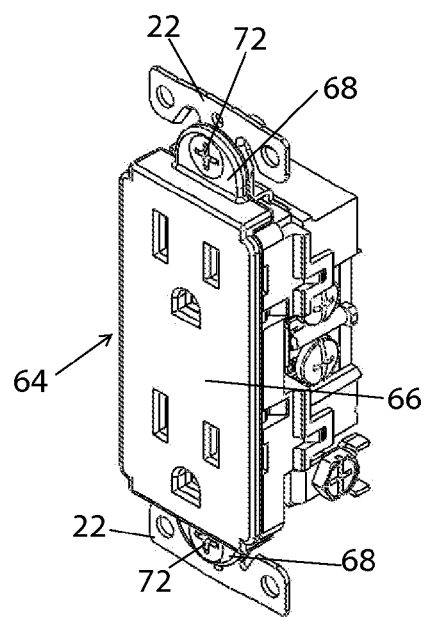

FIG. 9 illustrates an interchangeable faceplate embodiment 64 having a central body 66 and a pair of mounting tabs 68 extending preferably from the top and bottom. Each mounting tab 68 includes an aperture 70 which is arranged to receive a fastener 72 during installation (see FIG. 10). Fastener 72 may be installed through aperture 70 separately from a box mounting screw, or may be the only box mounting screw used to secure the electrical device to the electrical box. In the first instance, the electrical device mounting tab may include a threaded portion arranged to threadably receive the fastener, while in the second instance, the mounting tab need not, but may still be, threaded.

In all embodiments disclosed, a wall plate well known in the art may be installed over the electrical device after an interchangeable face has been installed. In those cases, the close fit of the wall plate may prevent the interchangeable face from being removed without first removing the wall plate, as the wall plate may contact at least a portion of the interchangeable face.

In these and in any other embodiments, the electrical device with interchangeable face may be made of any materials and fabricated and/or assembled in any manner. For instance the electrical device with interchangeable face may be manufactured from various different pieces and then screwed or glued together. The various elements, such as portions of the electrical device or the interchangeable faces, may be manufactured as one piece or may be manufactured as separate pieces to be joined together.

It will be understood that implementations are not limited to the specific components disclosed herein, as virtually any components consistent with the intended operation of a method and/or system implementation for an electrical device with interchangeable face may be utilized. Accordingly, for example, although particular bodies, arms, springs, and other components are disclosed, such components may comprise any shape, size, style, type, model, version, class, grade, measurement, concentration, material, weight, quantity, and/or the like consistent with the intended operation of a method and/or system implementation for an electrical device with interchangeable face. Implementations are not limited to uses of any specific components, provided that the components selected are consistent with the intended operation of a method and/or system implementation for an electrical device with interchangeable face.

Accordingly, the components defining any electrical device with interchangeable face implementation may be formed of any of many different types of materials or combinations thereof that can readily be formed into shaped objects provided that the components selected are consistent with the intended operation of an electrical device with interchangeable face implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any electrical device with interchangeable face implementation may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld (e.g. an ultrasonic weld), a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The implementations listed here, and many others, will become readily apparent from this disclosure. From this, those of ordinary skill in the art will readily understand the versatility with which this disclosure may be applied.

The invention claimed is:

1. An electrical device comprising:
   a device body having a rear section configured to fit into an electrical box, the rear section having at least one device mounting tab having an aperture for receiving a fastener that secures the device to the electrical box;
   a front section secured directly to the rear section;
   a movable element removably mounted to the front section; and
   a hollow frame surrounding the movable element and removably mounted to the front section.

2. The electrical device of claim 1, wherein the front section and the rear section are integrally formed.

3. The electrical device of claim 1, wherein the front section is secured to the rear section with at least one screw.

4. The electrical device of claim 1, wherein a removable wall plate surrounds the hollow frame.

5. The electrical device of claim 4, wherein the wall plate prevents removal of the hollow frame.

6. The electrical device of claim 1, wherein the movable element is pivotable on the front section.

7. The electrical device of claim 6, further comprising at least one switch button extending beyond the front section, wherein the movable element operates the at least one switch button to activate and deactivate the electrical device.

8. The electrical device of claim 6, wherein:
   the front section comprises a plurality of stops, a plurality of rocker mounts, and a plurality of ribs opposite the rear section;
   the moveable element is pivotally mounted to the rocker mounts; and
   the hollow frame comprises a plurality of slots engaged with the plurality of ribs.

9. The electrical device of claim 8, further comprising:
   a pair of central tabs on the movable element; and
   a pair of grooves on an internal surface of the frame, the pair of grooves being aligned with the pair of tabs to permit pivoting of the movable element in two directions.

10. The electrical device of claim 1, wherein the front section is removably coupled to the rear section.

11. The electrical device of claim 1, wherein the front section and the rear section are permanently joined.

12. An electrical device comprising:
   a device body having a rear section and at least one device mounting aperture;
   a front section coupled to the rear section;
   a moveable element pivotable on and removably secured to the front section; and
   a hollow frame surrounding the moveable element and mounted to the front section, wherein:
   the front section comprises a plurality of stops, a plurality of rocker mounts, and a plurality of ribs opposite the rear section;
   the moveable element is pivotally mounted to the rocker mounts; and
   the hollow frame comprises a plurality of slots engaged with the plurality of ribs.

13. The electrical device of claim 12, further comprising:
   a pair of central tabs on the movable element; and
   a pair of grooves on an internal surface of the frame, the pair of grooves being aligned with the pair of tabs to permit pivoting of the movable element in two directions.

* * * * *